US005547653A

United States Patent [19]

Webster et al.

[11] Patent Number: 5,547,653

[45] Date of Patent: Aug. 20, 1996

[54] CARBONIZATION OF HALOCARBONS

[75] Inventors: James L. Webster, Parkersburg, W. Va.; Scott C. Jackson, Kennett Square, Pa.

[73] Assignee: E. I. Du Pont de Nemours and Company, Wilmington, Del.

[21] Appl. No.: 327,760

[22] Filed: Oct. 24, 1994

[51] Int. Cl.[6] .............................. C01B 31/02; A62D 3/00

[52] U.S. Cl. ................. 423/445 R; 423/486; 423/240 R; 423/483; 588/213; 588/209; 208/262.1

[58] Field of Search ................................ 423/486, 245.1, 423/445 R, 445 B, 483, 240 R; 588/213, 209; 585/732; 208/262.1

[56] References Cited

U.S. PATENT DOCUMENTS

| | | | |
|---|---|---|---|
| 4,714,796 | 12/1987 | Senkan | 585/328 |
| 4,770,940 | 9/1988 | Ovshinsky et al. | 423/445 R |
| 4,851,600 | 7/1989 | Louw | 585/240 |
| 4,982,039 | 1/1991 | Benson et al. | 585/469 |
| 5,362,468 | 11/1994 | Coulon et al. | 423/445 R |
| 5,395,496 | 3/1995 | Tsantrizos et al. | 423/445 B |

*Primary Examiner*—Gary P. Straub
*Assistant Examiner*—Stuart L. Hendrickson

[57] ABSTRACT

Halocarbon is carbonized at a temperature of at least 600° C. in the presence of excess hydrogen and the absence of water to obtain carbon and anhydrous haloacid as the primary reaction products.

15 Claims, 1 Drawing Sheet

CARBONIZATION OF HALOCARBONS

FIELD OF THE INVENTION

This invention relates to the formation of carbon and other useful product from waste organic halocarbon.

BACKGROUND OF THE INVENTION

U.S. Pat. No. 4,982,039 (Benson) discloses the pyrolysis of halogen-containing organic compounds in a reducing atmosphere at a temperature in the range of about 825° C.–1124° C. The reference discloses the creation of this temperature and reducing atmosphere by combustion of oxygen with a stoichiometric excess of $CH_4$ or $H_2$ in accordance with the equations $CH_4+2O_2 \rightarrow CO_2+2H_2O$ and $2H_2+O2 \rightarrow H_2O$, respectively. The high temperature cleaves the halogen-carbon bonds of the halogen-containing organic compound and the halogens react with the excess hydrogen (from the excess $CH_4$ or hydrogen feed) to form HCl. The reaction product stream also contains hydrogen, hydrocarbons, with smaller amounts of carbon, referred to in Example 1 as soot. Unfortunately, the acid formed by this process is contaminated by the water formed from the reaction(s) described above, which leads to the stripping of the acid from the product stream with water, alkali, lime, or generally basic wash. Anhydrous acid has much eater value from the standpoint of her chemical use than acid which contains water.

The result of small amounts of carbon is the same result sought in other pyrolysis processes, e.g., U.S. Pat. Nos. 4,714,796 and 4,851,600.

SUMMARY OF THE INVENTION

It has now been discovered that a more valuable product mix, viz. carbon and anhydrous haloacid, can be obtained from halocarbon waste. This result is obtained by the process of anhydrously carbonizing halocarbon in the presence of excess hydrogen to form carbon and anhydrous haloacid as the primary reaction products.

"Carbonizing" means not only heating the halocarbon to thermally decompose it, often called pyrolysis, but to carry out the pyrolysis under more extreme conditions than just decomposing the halocarbon, to drive the reaction to convert the carbon atoms of the halocarbon to free carbon. This carbonization reaction is accompanied by hydrogenolysis (dehydrohalogenation), wherein the hydrogen present reacts with the halogen atoms, split off from their carbon atoms by the hydrogen or the high temperature of the reaction, to form anhydrous haloacid.

By "anhydrously" carbonizing is meant that the reactions involving hydrogen and the halocarbon or its thermal decomposition products do not create water as in the Benson process described above. This can be achieved by not having oxygen present as a reactant with hydrogen during the process, i.e., by essentially excluding "free oxygen" from the process and by not adding water to the reaction.

While Benson discloses that water may even be added to control the temperature of the reaction (column 4, lines 12–14), surprisingly, the reaction of the present invention proceeds to very efficient production of valuable products essentially without having water present, either created water or added water.

DETAILED DESCRIPTION OF THE INVENTION

Figure 1:
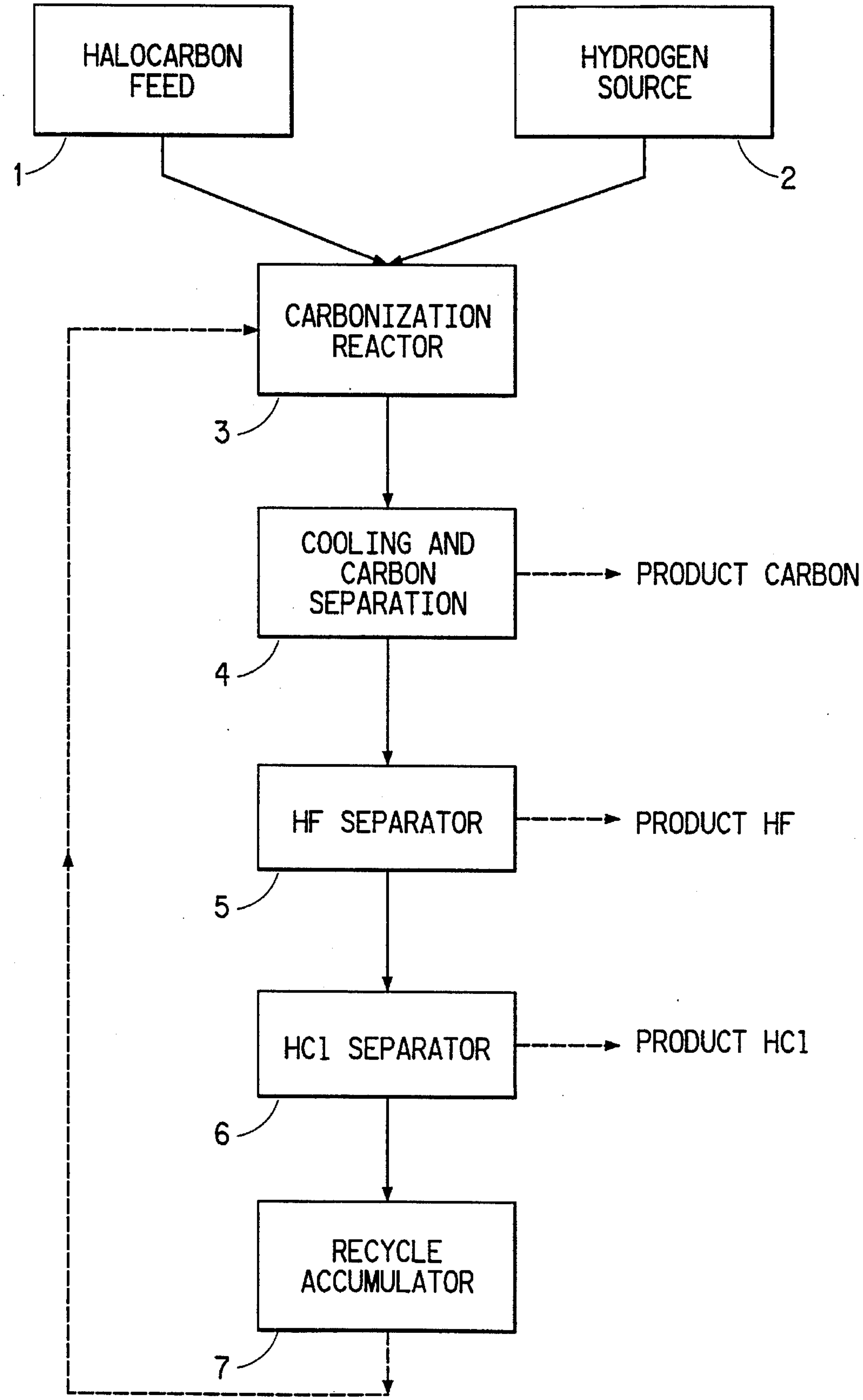
FIG. 1 is a block diagram of the carbonization process of this invention.

The halocarbons that can be subjected to the process of this invention include a wide variety of compounds such as but not limited to chlorocarbons (carbon tetrachloride, methylene chloride, trichloroethylene, etc.), chlorofluorocarbons (dichloroperfluoroethane, etc.), hydrochlorofluorocarbons (chlorodifluoromethane, etc.) hydrofluorocarbons (trifluoromethane, pentafluoroethane, tetrafluoroethane, etc.), perfluorocarbons (carbon tetrafluoride, perfluorobutene, etc.), other halogen containing hydrocarbons (methyl iodide, bromodifluoromethane), and even oxygen containing halo-organic compounds (haloethers, haloalcohols, haloesters, haloorganic acids, etc.). From the foregoing, it is apparent that the halogen moiety of the halocarbon can be F, Cl, Br, or I and mixtures thereof. The halocarbons can be fed to the process in the form of gases, liquids and even as solids, including polymers. Generally, the halocarbon will be a waste material which requires disposal in an environmentally friendly manner. This process is particularly advantageous for the destruction of perfluorocarbons, with the subsequent recovery of only carbon and anhydrous HF.

Hydrogen is present in the carbonization process either as added hydrogen or is formed in situ by decomposition of hydrocarbon, e.g., methane, ethane, ethylene, and other compounds containing only carbon and hydrogen, added to the reaction as the source of hydrogen. The hydrogen either reacts with halogen split off from the halocarbon by the carbonization process or helps to pull the halogen off of their carbon atoms, depending on the temperature of carbonization used and the particular halogens present. In either case, the hydrogen preferentially combines with the halogen atoms present to form anhydrous haloacids and the resultant residue of the halocarbon is carbon, these being the primary reaction products of the carbonization process.

The temperature of the carbonization reaction will depend on the particular halogen atoms present in the halocarbon to cause the halogen atoms to be split off from their carbon atoms, with fluorine atoms being the most difficult in this regard, but being assisted by the presence of hydrogen reactant. Generally, the carbonization temperature will be at least 600° C., and with sufficient contact time to cause the halocarbon to thermally decompose and together with the presence of hydrogen, to cause the formation of primarily carbon and anhydrous haloacids reaction products. The more usual temperatures of reaction are in the range of 800° C. to 1500° C., with the higher temperatures allowing shorter residence time in the reactor to complete the conversion process. Even higher temperatures (above 1500° C.) can be utilized, for example, in a hydrogen plasma reactor, with the halocarbon being injected into a hot hydrogen gas stream generated by the reactor.

Should there be any attending oxygen (trace amounts) in the various forms of the halocarbon feed, temperatures above 800° C. are preferred, helping to minimize the possible formation of water by forming CO or $CO_2$. Such byproduct gases, or inadvertent nitrogen in the process, can be vented from the system. The formation of water in the carbonization process is avoided by having the reaction zone be essentially free of free oxygen, which is normally accomplished by not adding molecular oxygen (or air) to the reaction. By free of "free oxygen" is meant the unavailability of oxygen in a form that will react with hydrogen to form water in the carbonization reaction. Any trace amounts of water that may be present in the reactant feeds to the process is believed to be decomposed along with the halocarbons.

Since the reaction is essentially oxygen free, an external source of heat is required to sustain the temperature of the reactor walls and thus the reaction itself. This external heat requirement is offset by the fact that the hydrodehalogenation reaction is strongly exothermic and thermodynamically favored. For example, for the reaction:

$$CHClF_2+H_2 \rightarrow C+HCl+2HF$$

the standard heat of reaction is −36 kcal/mol and the standard free energy of reaction is −45.3 kcal/mol. If one mol of the $CHClF_2$ is reacted in the presence of 10 mols of hydrogen, the adiabatic temperature rise is about 400° C. If methane is used as the hydrogen source, the temperature rise would be less. A lower ratio of hydrogen to the chlorofluorocarbon would also give a higher temperature rise. Excess hydrogen used or generated in the reaction can be recycled or utilized for other needs, as a fuel, for example.

Basically, the process of the present invention can be operated in two fashions, on a once-through basis or on a recycle basis. In either case, the primary reaction products removed from the reaction system are carbon and anhydrous haloacid. Ultimate conversion of halocarbon, i.e., comparison of amount of halocarbon in exit stream of single pass process or recycle process with amount of that halocarbon in feed to the process, is generally at least 70%, preferably at least 90% and more preferably at least 95%. Preferably these conversions also apply to any halocarbon decomposition products formed from the halocarbon feed to the process. The yield of anhydrous acid is generally at least 90%, and preferably at least 98%. The yield of carbon can be the same as for the anhydrous acid but can be somewhat lower if the presence of hydrocarbon in the exit stream is desirable. Hydrogen sources other than molecular hydrogen will contribute additional carbon to the product stream. With the once-through method, the temperatures are usually higher or longer contact times are used to assure that all of the halocarbons are converted to carbon and haloacid. Any excess hydrogen would be vented after the carbon and haloacids are recovered from the exit stream. With high enough temperatures or very long contact times, little excess hydrogen is required, but from a practical point of view, the hydrogen usually is from about 1.5 to 8 times the amount needed for the stoichiometric requirements to convert all of the halogens to anhydrous halogen acids.

When used as a recycle process, the carbonization reactor can generally be operated at lower temperatures, e.g., 700° C. to 950° C. and/or shorter contact times. Recycle gases, after the removal of the carbon and haloacids, could then include hydrogen, methane, other formed or added hydrocarbons (including olefins), any unconverted or formed halocarbons, and any haloacids not removed by the recovery process. Importantly, while there may be excess hydrogen, molecular or other sources thereof, within the system, only stoichiometric amounts of hydrogen are utilized since the only method by which hydrogen leaves the recycle mode is as the anhydrous halogen acids. The anhydrous halogen acid, if it contains any water at all, will conform to commercial standards of water content.

The process of this invention is conveniently illustrated and understood by reference to FIG. 1, which schematically shows the process in a representative recycle mode. The diagram is based on source 1 of halocarbon feed, such as $CF_2HCl$ or other halocarbon. It is understood that the feeds to this carbonization process should be as free of water as practical, and without any accompanying free oxygen. If necessary, pre-drying can be used to remove water and pre-reaction with hot charcoal can be used to remove free oxygen. In the recycle mode, inerts such as nitrogen should also be avoided since they will build up in the recycle gas stream and require venting after depletion of the fluorocarbon gases.

A source 2 of hydrogen is provided. In the recycle mode, and a with hydrocarbon hydrogen source, the system rapidly becomes a hydrogen rich process as the hydrocarbon is broken down and carbon is removed.

The halocarbon feed, the hydrogen source feed, and any recycle materials, i.e., the remainder of the reaction product stream, from accumulator 7 are fed to the carbonization reactor 3. These feeds may or may not be preheated. At temperatures above 1150° C., trace amounts of water and oxygen, if present, are converted almost totally to hydrogen and carbon monoxide. The reactor can be a conventional pyrolysis furnace built of heat-stable and acid-resistant material and is usually vertical so that formed carbon particles can fall through the reactor and exit at the bottom of the reactor vessel, much like the formation of carbon black. The reactor, depending on feed material, desired temperature of operation and method of heating, can be made from a variety of materials. These can include such materials as platinum, halogen resistant bricks and ceramics, nickel, INCONEL®, carbon and graphite, etc. The goal is to minimize loss of reactor walls and to maintain the necessary heat flows. In general, the reactor is externally heated to provide the necessary energy to sustain the carbonization reaction and to provide for the formation of free hydrogen from any hydrocarbon feed source. Depending on the reactor design, the external heating can be provide by variety of methods, including such techniques as electrical heating, gas fired heating, microwave heating, induction heating, resistance heating, etc. It is also possible to use a non-externally heated reactor. One such example would be a reactor that would act as an insulated containment vessel, with all of the heat coming from any exothermic nature of the involved reactions and from a preheated hydrogen source. For example, a hydrogen stream could be preheated such as in a plasma reactor to a temperature necessary to sustain the desired reaction temperatures within the carbonization reactor vessel.

As the gases leave the carbonization zone of the reactor 3, they are cooled. This cooling, which can start in the exit portion of the reactor vessel, can be provided by many methods known to those skilled in the art. Contact cooling with a cold surface is the most common technique, but the injection of a cooled fluid may be used to quench the reaction products, e.g., cooled recycled HF. The goal is to get the exit stream to a temperature at which the initial collection of the carbon particles in a carbon separator 4 can be started. Thus, as the exit stream is cooled, the carbon particles within separator 4 are recovered by any of a variety of processes, singularly or together, including such methods as cyclone separation, filtering, scrubbing with a fluid other than water, etc., conventionally used in the carbon black industry.

Once the carbon is removed from the process stream, the gases can be further cooled and known techniques applied to recover the halogen acids, either singularly or combined. Usually the anhydrous HF, if present, would be removed in an HF separator 5 and techniques such as condensation, decanting, distillation, adsorption, absorption, chemical reaction, membranes, diffusion, etc., could be applied. Depending on the appropriateness, these operations, and others within the entire process, may be performed at pressures at, above, or below atmospheric pressure, otherwise the entire process may be carried out at atmospheric pressure. Next, if present, HI or any HBr would usually be recovered by similar know techniques. Generally, the last haloacid to be removed from the system would be the anhydrous HCl via HCl separator 6 as HCl has the lowest boiling point at −84.9° C. Distillation can be used to recover the acid from any recycled gases, or if a once-through mode is being used, from exiting hydrogen. Other known methods may be used to recover this acid.

In the recycle mode, all of the remaining reaction product stream (unreacted feed materials, hydrocarbon and halocarbon reaction products) from the recycle accummulator 7 are fed back into the reactor 3 where they would then undergo additional pyrolysis/hydrogenolysis (carbonization) reactions, where preferably, the conversion of halocarbon feed from source 1 is at least 10% per pass through the reactor. If the fresh halocarbon feed from source 1 to the process would be turned off and the recycled process continued, the recycle stream would be expected to become more hydrogen rich, with the stream eventually becoming only hydrogen.

The present invention, has a number of other advantages. In addition to the formation of anhydrous haloacids, carbon formed on the reactor walls gives an autocatalytic enhancement of the decomposition of many of the feed halocarbons. In general, the carbon particles fall through the vertical reactor or, after some level of adhesion, slough off or are otherwise mechanically removed from the reactor walls. These adhesions enhance many of the decompositions.

Formation of carbon tetrafluoride within this process usually does not occur. This is important since $CF_4$ is the most difficult of the perfluorocarbons to decompose, requiring the highest temperatures and/or longest reactor residence times.

EXAMPLES

The following examples will further illustrate this invention, showing that it is possible to totally destroy halogen-containing hydrocarbons, converting them into anhydrous acids and carbon. In this form, they can be recovered by known technologies and can be beneficially and economically utilized. As temperatures are taken higher, contact times can be shortened while obtaining the same level of conversions. At temperatures above about 1250° C., and with excess hydrogen, single pass operation becomes more attractive as conversions are maximized.

Reactions were carried out in tubular reactors heated by a 12-inch (30.5-cm) long split shell electric furnace. The reactants were dry, and free oxygen and water were not added, so that the carbonization reactions were anhydrous. The flows of reactants were maintained through valve-controlled rotameters. Approximate contact times were calculated based on feed flow rates, assuming that the middle 4 inches (10 cm) of the reactor were at reaction temperature. Carbon exiting the reactor fell into a knock-out pot. For experimental convenience, the anhydrous exit gases were scrubbed with water to remove the formed halo acids. The remaining exit gases were dried and then sampled for composition. Exit gas flow rate was measured on the scrubbed stream.

Exit gas composition was determined with a Hewlett-Packard 5880 gas chromatograph (GC) with a 20-foot (6.1-m) long, 0.125-inch (3-mm) diameter column (Supelco, Inc.)containing 1% Supelco's SP-1000 on 60/80 mesh Carbopack® B, using a thermal conductivity detector and helium as a carrier gas. The column temperature was held at 40° C. for 5 min, then programmed to increase at 20° C./min until the temperature reached 180° C. The column was held at 180° C. for another 20 min. GC results exclude molecular hydrogen and any CO that may have been present in the exit gas. Otherwise, unless otherwise noted, the compounds in the exit stream are listed in their order of elution from the GC column. Listing of two compounds together, e.g., $CF_2H_2/CF_3H$, indicates that they were not fully resolved by the GC for that example. Unknowns in the exit stream are designated by their retention time in minutes in the GC column, as shown by the GC printout (e.g., U-7.6). Results were recorded as area %, which is a close approximation of mol %. Since there was no oxygen in any form was fed to the process in Examples 1–4 and 6, the presence of $CO_2$, if any, would have been accidental, and the $CO_2/CFH_3$ peak in the GC record was attributed to $CFH_3$ in most cases.

The word fluorocarbon, in general, means a compound containing carbon and fluorine, though possibly other elements also.

Example 1

Hydrogen and chlorodifluoromethane (HCFC-22, $CF_2HCl$) were reacted in a horizontal 0.5-inch (1.3-cm) diameter tube made from Inconel® 600 (The International Nickel Co.). A thermocouple placed at the center of the reactor was housed in an 0.125-inch (3-mm) diameter nickel thermowell. Test conditions and GC results are summarized in Table 1. The $H_2/CF_2HCl$ ratios are molar basis. A contact time of 1.5 sec at a total feed rate of 100 $cm^3$/min corresponds to an effective reaction volume of 9.5 $cm^3$. Conversion of $CF_2HCl$ to carbon and haloacid (HF and HCl) is shown by exit flow rate being less than feed flow rate, by higher proportion of methane and lower proportion of $CF_2HCl$ in the exit stream, and the very high acidity of the scrub water. Runs 1–5 show that conversion of $CF_2HCl$ increases, and total fluorocarbons including $CF_2HCl$ in the exit stream, decrease, with increasing temperature. Runs 6–8 show that residual fluorocarbons decrease with increasing contact time. All of these runs were made on a once-through basis, with no recycle. In a recycle mode of operation, the hydrocarbons formed would be returned to the feed as hydrogen source along with any halocarbon present. The runs were made in the sequence indicated by the run number without dismantling the apparatus between runs. Note that Run 7 showed lower levels of residual fluorocarbons than would be expected from the series of Runs 1–5. This is thought to come from carbon buildup within the reactor acting as an in-situ catalyst. Carbon was found in the reactor following the run sequence.

TABLE 1

Conditions and Results for Example 1

| Conditions | Run Number 1 | 2 | 3 | 4 | 5 | 6 | 7 | 8 |
|---|---|---|---|---|---|---|---|---|
| $H_2/CF_2HCl$ ratio | 6/1 | 6/1 | 6/1 | 6/1 | 6/1 | 6/1 | 6/1 | 6/1 |
| Contact time (sec) | 1.5 | 1.5 | 1.5 | 1.5 | 1.5 | 3.0 | 1.5 | 0.8 |
| Temperature (°C.) | 450 | 600 | 700 | 800 | 900 | 750 | 750 | 750 |
| Feed flow | 100 | 100 | 100 | 100 | 100 | 50 | 100 | 200 |

TABLE 1-continued

| Conditions and Results for Example 1 | | | | | | | | |
|---|---|---|---|---|---|---|---|---|
| | Run Number | | | | | | | |
| Conditions | 1 | 2 | 3 | 4 | 5 | 6 | 7 | 8 |
| (cc/min) | | | | | | | | |
| Exit flow (cc/min) | 103 | 71 | 68 | 68 | 68 | 26 | 69 | 162 |
| GC (area %) | | | | | | | | |
| $CH_4$ | 0.0 | 33.2 | 43.8 | 53.6 | 69.0 | 83.5 | 69.0 | 47.4 |
| $CO_2/CFH_3$ | 0.0 | 0.2 | 0.8 | 1.3 | 2.2 | 0.6 | 0.4 | 0.2 |
| $CF_2H_2/CF_3H$ | 0.1 | 2.7 | 29.0 | 25.6 | 11.3 | 7.8 | 25.1 | 45.6 |
| $C_2H_4$ | 0.0 | 0.7 | 0.1 | 0.0 | 0.1 | 0.9 | 0.5 | 0.5 |
| $C_2H_6$ | 0.0 | 1.2 | 1.0 | 0.2 | 1.2 | 1.8 | 1.2 | 1.9 |
| $C_2F_4$ | 0.0 | 3.4 | 1.5 | 0.5 | 0.9 | 0.7 | 0.0 | 1.0 |
| U-7.6 | 0.0 | 0.2 | 2.3 | 3.7 | 4.4 | 0.0 | 0.2 | 0.7 |
| $CF_2HCl$ | 99.5 | 57.8 | 20.0 | 10.6 | 5.0 | 0.4 | 2.3 | 0.7 |
| U-8.2 | 0.0 | 0.0 | 0.0 | 2.6 | 4.3 | 0.0 | 0.0 | 0.4 |
| Others | 0.4 | 0.6 | 0.5 | 1.9 | 1.6 | 4.3 | 1.3 | 1.6 |
| Totals | 100 | 100 | 100 | 100 | 100 | 100 | 100 | 100 |

Example 2

Methane and HCFC-22 were reacted in the apparatus used for Example 1. Test conditions and GC results are summarized in Table 2. The GC results are presented on a methane-free and hydrogen-free basis, so listed compounds account for only about 10% of the exit stream. However, both methane and hydrogen go through the system and are included in the exit flow rates. The presence of hydrogen in the exit stream for each run was verified by a negative output peak on the GC trace. Conversion of $CF_2HCl$ to carbon and haloacid is shown by the exit flow rate being less than the feed flow rate, by the low proportion of $CF_2HCl$ in the exit stream, and by high acidity of the scrub water. No $C_2F_4$ was detected in these product streams. The large unknown U-10.4 is noted but unexplained. If U-10.4 is assumed to be a fluorocarbon, then the runs with the 3 sec contact time showed larger decomposition of fluorocarbons than those run at 1.5 sec. The longer contact time runs also allowed for a slightly larger formation of two-carbon hydrocarbons. When the reactor was opened at the end of the run sequence, it was found to be packed with carbon, the gas flow apparently being inadequate to sweep all of the carbon out of the reactor to the knock-out pot.

TABLE 2

| Conditions and Results for Example 2 | | | | | | |
|---|---|---|---|---|---|---|
| | Run Number | | | | | |
| Conditions | 1 | 2 | 3 | 4 | 5 | 6 |
| $CH_4/CF_2HCl$ ratio | 4/1 | 6/1 | 8/1 | 4/1 | 6/1 | 8/1 |
| Feed flow (cc/min) | 50 | 50 | 50 | 100 | 100 | 100 |
| Temperature (°C.) | 800 | 800 | 800 | 800 | 800 | 800 |
| Contact time (sec) | 3 | 3 | 3 | 1.5 | 1.5 | 1.5 |
| Exit flow (cc/min) | 37 | 41 | 47 | 76 | 84 | 95 |
| GC (area %) | | | | | | |
| $CO_2/CFH_3$ | 1.3 | 0.6 | 0.8 | 0.2 | 0.3 | 0.6 |
| $CF_2H_2/CF_3H$ | 15.8 | 29.0 | 31.1 | 24.0 | 22.6 | 27.7 |
| $C_2H_4$ | 6.0 | 1.5 | 0.9 | 0.8 | 0.4 | 0.2 |
| $C_2H_6$ | 50.3 | 49.8 | 49.1 | 38.5 | 36.0 | 34.2 |
| U-7.6 | 0.4 | 3.8 | 4.5 | 3.2 | 9.8 | 7.2 |
| $CF_2HCl$ | 1.3 | 0.51 | 0.3 | 0.2 | 0.1 | 0.1 |
| U-8.2 | 0.0 | 0.2 | 0.5 | 1.0 | 2.4 | 3.8 |
| U-10.4 | 13.4 | 6.8 | 4.8 | 21.3 | 20.2 | 18.3 |

TABLE 2-continued

| Conditions and Results for Example 2 | | | | | | |
|---|---|---|---|---|---|---|
| | Run Number | | | | | |
| Conditions | 1 | 2 | 3 | 4 | 5 | 6 |
| Others | 11.5 | 7.8 | 8.0 | 10.8 | 8.2 | 7.9 |
| Totals | 100 | 100 | 100 | 100 | 100 | 100 |

Example 3

Equipment and procedures similar to those of Example 1 were used, except that the reactor was a 16-inch (40.6 cm) long, one-inch (2.54 cm) diameter 316 stainless steel tube having 0.049 inch (1.2 mm) wall thickness, and the 12-inch split shell furnace was rotated so that the reactor axis was vertical with feed gas inlet at the top. This orientation allowed the formed carbon to fall out of the reactor into a knock-out pot at the reactor exit. A 0.25-inch (6.4-mm) nickel thermowell having five thermocouples distributed inside its length was positioned in the middle of the reactor. The reported reaction temperature is the average of the readings for the four thermocouples that exhibited the highest temperatures, located 4, 5, 6 & 7 inches (10, 13, 15 & 18 cm) into the reactor measured from the gas inlet end of the furnace. The individual temperatures typically deviated from the average temperature by less than ±15° C. It was assumed that the reactor volume was contained in four inches of the tubing, less the volume of the thermowell. Contact time was based on this volume at temperature. Conversion of $CF_2HCl$ to carbon and haloacid is shown by exit flow rate being less than feed flow rate, by high proportion of methane and low proportion of $CF_2HCl$ in the exit stream, and by the high acidity of scrub water. A large amount of carbon found in the knock-out pot after completion of Runs 1–8 was not weighed. These data show that longer contact time gives higher levels of conversion (Run 1 vs. Run 8, or Run 4 vs. Run 6), and that higher temperatures give more conversion (Run I vs. Run 3, or Run 6 vs. Run 7). Extremely high levels of excess hydrogen are not necessarily required (or economically desired) at the higher temperature (Run 7 vs. Run 5), but can be helpful at lower temperature (Run 4 vs. Run 1 ).

TABLE 3

| Conditions and Results for Example 3 | | | | | | | | |
|---|---|---|---|---|---|---|---|---|
| | Run Number | | | | | | | |
| Conditions | 1 | 2 | 3 | 4 | 5 | 6 | 7 | 8 |
| Temperature (°C.) | 600 | 900 | 900 | 600 | 900 | 600 | 900 | 600 |
| $H_2$/ $CF_2HCl$ ratio | 2/1 | 8/1 | 2/1 | 8/1 | 2/1 | 8/1 | 8/1 | 2/1 |
| Feed flow (cc/min) | 50 | 50 | 50 | 200 | 200 | 200 | 200 | 200 |
| Contact time (sec) | 17.2 | 12.8 | 12.8 | 17.2 | 3.2 | 4.2 | 3.2 | 4.3 |
| Exit flow (cc/min) | 34 | 38 | 28 | 50 | 115 | 198 | 189 | 160 |
| GC (area %) | | | | | | | | |
| $CH_4$ | 20.8 | 94.8 | 98.0 | 43.1 | 91.8 | 24.7 | 92.1 | 5.6 |
| $CO_2/CFH_3$ | 0.1 | 0.6 | 0.4 | 0.2 | 1.4 | 1.2 | 3.0 | 0.2 |
| $CF_2H_2/CF_3H$ | 36.0 | 0.0 | 0.0 | 32.5 | 0.2 | 17.5 | 1.3 | 19.1 |
| $C_2H_4$ | 0.6 | 0.0 | 0.0 | 1.5 | 4.1 | 1.4 | 0.3 | 0.3 |

TABLE 3-continued

| Conditions and Results for Example 3 | | | | | | | | |
|---|---|---|---|---|---|---|---|---|
| | Run Number | | | | | | | |
| Conditions | 1 | 2 | 3 | 4 | 5 | 6 | 7 | 8 |
| $C_2H_6$ | 3.2 | 0.0 | 0.0 | 6.0 | 1.0 | 2.9 | 0.2 | 0.8 |
| $C_2F_4$ | 2.1 | 0.0 | 0.0 | 1.3 | 0.0 | 3.3 | 0.0 | 3.9 |
| U-7.6 | 2.0 | 0.1 | 0.0 | 0.0 | 0.8 | 4.1 | 0.0 | 1.7 |
| $CF_2HCl$ | 33.2 | 0.1 | 0.1 | 12.9 | 0.0 | 37.0 | 0.6 | 65.8 |
| U-8.2 | 0.0 | 0.1 | 0.0 | 0.0 | 0.1 | 4.0 | 0.2 | 0.0 |
| U-11.9 | 0.1 | 1.1 | 0.4 | 0.4 | 0.0 | 0.0 | 0.0 | 0.2 |
| U-27.1 | 0.2 | 1.3 | 0.6 | 0.5 | 0.0 | 0.0 | 0.0 | 0.0 |
| U-31.1 | 0.0 | 0.6 | 0.2 | 0.2 | 0.0 | 0.0 | 0.0 | 0.0 |
| Others | 1.7 | 1.3 | 0.3 | 1.4 | 0.6 | 3.9 | 2.3 | 2.4 |
| Totals | 100 | 100 | 100 | 100 | 100 | 100 | 100 | 100 |

Example 4

The equipment and procedures of Example 3 were used, except that trifluoromethane (HFC-23, $CF_3H$) was used as the fluorocarbon feed and methane was used as the hydrogen source in some runs. Run conditions and GC results are given in Table 4. Run 1 (Table 4) and Run 5 of Example 3, each with at least 100% excess hydrogen, show that it is much more difficult to destroy $CF_3H$ than to destroy $CF_2HCl$. Run 3 (Table 4) used only the stoichiometric amount of hydrogen based on total F and H atoms in the feed, and showed incomplete conversion on a once-through basis at 900° C. Run 2 shows the advantage of using excess hydrogen at the same contact time. Run 2 and Run 5 showed similar levels of conversion of $CF_3H$ with excess hydrogen present, but using different sources for the hydrogen. The exit flow was higher in Run 2 because there was a greater excess of hydrogen. Runs 4 and 5 show the effect of higher temperature, Runs 5 and 6 the effect of different contact time, and Runs 6 and 7 the effect of excess hydrogen on the conversion of $CF_3H$.

TABLE 4

| Conditions and Results for Example 4 | | | | | | | | |
|---|---|---|---|---|---|---|---|---|
| | Run Number | | | | | | | |
| Conditions | 1 | 2 | 3 | 4 | 5 | 6 | 7 | 8 |
| Temperature (°C.) | 900 | 900 | 900 | 700 | 900 | 900 | 900 | 800 |
| $H_2$/ $CF_3H$ ratio | 3/1 | 3/1 | 1/1 | — | — | — | — | — |
| $CF_4$/ $CF_3H$ ratio | — | — | — | 1/1 | 1/1 | 1/1 | 6/1 | 3/1 |
| Feed flow (cc/min) | 200 | 25 | 25 | 25 | 25 | 200 | 200 | 100 |
| Contact time (sec) | 3 | 24 | 24 | 28 | 24 | 3 | 3 | 6 |
| Exit flow (cc/min) | 114 | 17 | 8 | 19 | 9 | 66 | 214 | 87 |
| GC (area %) | | | | | | | | |
| $CH_4$ | 38.0 | 93.6 | 67.9 | 38.5 | 88.3 | 53.9 | 88.0 | 61.9 |
| $CO_2/CFH_3$ | 4.6 | 0.4 | 1.4 | | 0.1 | 0.4 | 0.1 | 0.1 |
| $CF_2H_2/CF_3H$ | 27.0 | 3.3 | 13.4 | 56.9 | 3.7 | 11.7 | 1.2 | 24.4 |
| $C_2H_4$ | 18.0 | 0.2 | 4.1 | | 3.9 | 4.1 | 2.5 | 0.7 |
| $C_2H_6$ | 4.9 | 0.2 | 2.6 | 1.9 | 1.0 | 22.2 | 5.5 | 9.1 |
| U-7.6 | 4.0 | 0.3 | 7.6 | | 0.7 | 1.3 | 0.1 | 0.6 |
| Others | 3.5 | 2.0 | 3.0 | 2.7 | 2.3 | 6.4 | 2.6 | 3.2 |
| Totals | 100 | 100 | 100 | 100 | 100 | 100 | 100 | 100 |

Example 5

The equipment and procedures of Example 4 were used, except that perfluoroethane, perfluoromethane, and $C_5F_8H_4O$ (an ether) were used individually as the fluorocarbon feed in various runs as shown in Table 5. The $C_5F_8H_4O$ is a liquid under ambient conditions and was fed by a syringe pump to an inlet at the top of the reactor at a rate equivalent to the gas flow rates shown. Runs 1–3 show that higher temperatures and/or longer contact times are required to destroy $C_2F_6$ than to destroy $CF_3H$ (Example 4). Still, the data show high enough conversion to indicate that utilization of a recycle system would enable removal of $C_2F_6$, whether using molecular hydrogen or methane as the hydrogen source. Note that exit flow rate in Run 1 exceeded feed flow rate, a situation that can occur due to formation of molecular hydrogen when using a hydrogen source such as $CH_4$. Run 3 is one of the very few times that formed $CF_4$ was ever observed in the exit stream. Run 4 ($CF_4$ feed) shows that this can be a concern in that the $CF_4$ is difficult to destroy even at 1100° C., which was about the temperature limit of the equipment employed. Temperatures greater than 1200° C. are favored for the pyrolysis of $CF_4$. For the runs with $C_5F_8H_4O$ feed, only stoichiometric amounts of hydrogen were used for reaction with the $C_5F_8H_4O$ in Run 5–7. Run 8 had 50% excess hydrogen with respect to stoichiometry, and there was significantly less fluorine containing material in the product stream. Runs 6 and 7 were made the day after Run 5. The reactor had been cooled and left with a nitrogen purge overnight. This may have affected the catalytic activity of any carbon on the walls as exemplified by the absence of $C_5F_8H_4O$ from the product stream. Even Run 7, which was at 700° C., would be a good candidate for a recycle process.

TABLE 5

Conditions and Results for Example 5

| | Run Number | | | | | | | |
|---|---|---|---|---|---|---|---|---|
| | 1 | 2 | 3 | 4 | 5 | 6 | 7 | 8 |
| Feed gas | $C_2F_6$ | $C_2F_6$ | $C_2F_6$ | $CF_4$ | $C_5F_8H_4O$ | $C_5F_8H_4O$ | $C_5F_8H_4O$ | $C_5F_8H_4O$ |
| Temperature (°C.) | 850 | 950 | 1000 | 1100 | 900 | 900 | 700 | 900 |
| $H_2$/feed ratio | — | — | 5/1 | 4/1 | 2/1 | 2/1 | 2/1 | — |
| $CH_4$/feed ratio | 2/1 | 2/1 | — | — | — | — | — | 2/1 |
| Feed flow (cc/min) | 25 | 25 | 25 | 25 | 50 | 100 | 50 | 100 |
| Contact time (sec) | 25 | 23 | 22 | 20 | 12 | 6 | 14 | 6 |
| Exit flow (cc/min) | 33 | 17 | 11 | 14 | 26 | 45 | 47 | 82 |
| GC (area %) | | | | | | | | |
| $CH_4$ | 43.7 | 95.0 | 89.5 | 4.2 | 31.4 | 18.2 | 16.9 | 59.6 |
| $CF_4$ | | | 1.2 | 95.7 | | | | |
| $CO_2/CFH_3$ | 0.1 | | 2.7 | | 4.2 | 3.4 | 1.1 | 0.9 |
| $CF_2H_2/CF_3H$ | 3.1 | 0.3 | 1.0 | | 23.8 | 27.4 | 38.6 | 11.0 |
| $C_2H_4$ | | 0.6 | | | 6.7 | 9.4 | 2.9 | 6.7 |
| $C_2F_6$ | 52.8 | 3.5 | 2.1 | | 3.9 | | | |
| $C_2H_6$ | | | | | 13.6 | 25.6 | 9.9 | 15.9 |
| U-6.4 | | | | | 3.3 | 2.4 | 3.1 | 0.5 |
| $C_2F_5H$ | 0.1 | | | | 1.5 | 2.2 | 0.5 | 0.4 |
| U-7.6 | | | | | 0.6 | 1.8 | 0.5 | 0.8 |
| U-10.5 | | | | | 0.3 | 0.8 | 4.2 | 0.5 |
| U-11.0 | | | | | 1.0 | 0.8 | 5.5 | 0.3 |
| U-11.6 | | | | | | 3.8 | 6.5 | |
| $C_5F_8H_4O$ | | | | | 2.8 | | | 0.4 |
| U-27.1 | | | 2.0 | | 1.1 | 0.3 | 0.2 | 0.7 |
| U-31.1 | | | | | 1.2 | 0.1 | 1.0 | 0.1 |
| Others | 0.2 | 0.6 | 1.5 | 0.1 | 4.6 | 3.8 | 10.0 | 2.2 |
| Totals | 100 | 100 | 100 | 100 | 100 | 100 | 100 | 100 |

Example 6

This example illustrates the invention in recycle mode of operation. The reactor was the same as in Example 5, with reactor temperature of 900° C. In this demonstration, a 5-liter plastic bag (balloon) was used as a feed reservoir. The bag was purged with nitrogen to remove most of the oxygen, vented, and initially charged with 1400 ml each of $CF_3H$ and $CH_4$. This mixture was circulated in a loop exterior to the furnace and when the furnace, under nitrogen flow, reached the desired 900° C. reaction temperature, the nitrogen purge was stopped and the reactive gases were fed to the furnace at about 200 $cm^3$/min through a rotameter. The contact time was about 3 sec. After acids were removed from the exit stream, the exit gases were returned to the bag where they mixed with bag inventory for recycle to the furnace. Exit gases were not scrubbed to remove the acids. The gases passed instead to an adsorber/reactor system designed so it could be weighed before and after each run to see how much acid had been collected. The gases were first contacted with sodium fluoride to complex the HF and remove it from the gas stream. Next, the gas stream was passed over sodium hydroxide, supported on a solid inert material to remove any HCl (as would be formed in Example 7). Since the reaction with the caustic would generate water, a calcium sulfate bed was next in line to trap this water. The acid free gases could be sampled downstream of the acid removal step before return to the feed reservoir bag for recycle. The gases next passed into a 5–7 liter plastic bag system where they could be held for recycle and mixed together. In this mode of operation, there was no makeup addition of either $CF_3H$ or $CH_4$, so the gas composition changed during the time of the run. As shown by the GC results in Table 6, all of the fluorine containing material had disappeared within 100 min of operation, indicating 100% conversion and 100% yield of HF and yield of carbon greater than 95%. The total area under the GC curves fell throughout the run as more and more of the $CH_4$ was converted to hydrogen and carbon, which are not recorded by the GC. The carbon dioxide probably came from oxygen that was not purged totally from the system. The weight gain in the adsorbers was 2.77 g which accounted for 81% of potential HF recovery. Part of the HF could have been left on the carbon formed on the interior surface of the reactor and collected in the knock-out pot.

TABLE 6

GC Results for Example 6

| | Sample Number | | | | | |
|---|---|---|---|---|---|---|
| | 1 | 2 | 3 | 4 | 5 | 6 |
| Elapsed time (min) | 10 | 20 | 30 | 50 | 100 | 120 |
| GC (area %) | | | | | | |
| $CH_4$ | 85.7 | 91.6 | 93.1 | 96.8 | 98.5 | 97.0 |
| $CO_2$ | | 0.4 | 0.8 | 1.0 | 1.5 | 3.0 |
| $CFH_3$ | 1.5 | 0.9 | 1.5 | 0.6 | | |
| $CF_2H_2/CF_3H$ | 7.3 | 4.3 | 3.0 | 0.8 | | |
| $C_2H_4$ | 1.2 | 0.5 | 0.1 | | | |
| $C_2H_6$ | 1.9 | 0.6 | 0.3 | 0.1 | | |
| U-7.4 | 0.2 | 0.2 | 0.1 | | | |
| U-7.6 | 0.5 | 0.5 | 0.3 | 0.4 | | |
| U-27.1 | 0.8 | 0.3 | 0.1 | | | |
| U-31.1 | 0.7 | 0.2 | 0.1 | | | |
| Others | 0.2 | 0.5 | 0.6 | 0.3 | | |
| Totals | 100 | 100 | 100 | 100 | 100 | 100 |
| GC total area | 1476 | 1199 | 901 | 530 | 258 | 135 |

Example 7

The equipment of Example 6 was used and similar procedures were followed, except that the reactor temperature was held at 850° C. and the initial charge to the feed reservoir bag was 3200 ml of hydrogen and 800 ml of a fluorocarbon gas mixture that was analyzed by GC to contain about 35% $C_2F_4HCl$, 19% $C_4F_8$ (perfluorobutene), 13% $C_3F_6HCl$, 6% $C_2F_4Cl_2$, 3% $C_5F_8H_4O$, and miscellaneous other chlorofluorocarbons. The average molecular weight of the fluorocarbon gas mixture was estimated to be about equivalent to the molecular weight of the $C_3F_6HCl$ (186.5) Trends in GC results were generally similar to those of Example 6. The adsorbers showed a weight gain of 3.27 g, thus accounting for about 66% of potentially recoverable HF and HCl calculated on the basis of the estimated molecular weight of the gas mixture. No attempt was made to recover any of the HF or HCl that might have been left on the cooled carbon. For sample 6 in this Example, the conversion of the perfluorocarbon/hydrofluorochlorocarbon/hydrofluorocarbon/chlorofluorocarbon feed was about 98%, with a yield of haloacid of about 98% and of carbon of about 80%. The large proportion of $CH_4$in the exit stream could be recycled further to increase the yield of carbon.

TABLE 7

GC Results for Example 7

| | Sample Number | | | | | |
|---|---|---|---|---|---|---|
| | 1 | 2 | 3 | 4 | 5 | 6 |
| Elapsed time (min) | 15 | 30 | 45 | 60 | 75 | 90 |
| GC (area %) | | | | | | |
| $CH_4$ | 40.9 | 53.9 | 72.0 | 90.5 | 97.4 | 99.2 |
| $CO_2$ | 1.8 | 0.9 | 0.2 | 0.2 | 0.2 | 0.4 |
| $CFH_3$ | | | 0.1 | | | |
| $CF_2H_2/CF_3H$ | 28.0 | 21.7 | 15.2 | 5.5 | 0.9 | |
| $C_2H_4$ | 1.7 | 1.0 | 0.1 | | | |
| $C_2H_6$ | 4.7 | 3.6 | 1.7 | 0.3 | 0.2 | 0.1 |
| U-7.4 | 5.1 | 4.3 | 3.9 | 2.2 | 0.7 | |
| U-7.6 | 10.0 | 7.9 | 5.1 | 0.7 | | |
| U-8.2 | 0.8 | 0.6 | 0.4 | 0.1 | | |
| U-10.9 | 0.2 | 0.1 | | | | |
| U-11.7 | 0.4 | 0.1 | 0.1 | | | |
| U-11.9 | | 4.1 | 0.4 | 0.2 | 0.2 | 0.1 |
| U-13.2 | 0.3 | 0.3 | 0.3 | 0.1 | | |
| U-27.1 | 3.0 | 0.7 | 0.2 | | | |
| U-31.1 | 1.5 | 0.3 | | | | |
| Others | 1.6 | 0.5 | 0.3 | 0.2 | 0.4 | 0.2 |
| Totals | 100 | 100 | 100 | 100 | 100 | 100 |
| GC total area | 598 | 500 | 316 | 161 | 142 | 122 |

What is claimed is:

1. Process consisting essentially of anhydrously carbonizing halocarbon in the presence of excess hydrogen to form carbon particles and anhydrous haloacid as the primary reaction products, said excess of said hydrogen being with respect to the stoichiometric requirement to convert all of the halogen of said halocarbon to said haloacid, and recovering said carbon particles and said anhydrous haloacid by separating said carbon particles and said haloacid from each other and from other reaction products and from any unreacted hydrogen and halocarbon.

2. Process of claim 1 wherein said hydrogen is formed in situ from methane or other hydrocarbon.

3. Process of claim 1 wherein the carbonization temperature is at least 600° C.

4. Process of claim 1 wherein said halocarbon contains chlorofluorocarbon or hydrofluorochlorocarbon and said haloacid is a mixture of HCl and HF.

5. Process of claim 1 wherein said halocarbon contains perfluorocarbon or hydrofluorocarbon and said anhydrous haloacid is HF.

6. Process of claim 1 wherein the carbonization is carried out in an externally heated reactor or at least part of the heating within said reactor is supplied by preheated hydrogen.

7. Process of claim 1 wherein said carbon forms a coating on the interior wall of said reactor.

8. Process of claim 1 including the recycle of said other reaction products and unreacted hydrogen and halocarbon to the carbonization reaction.

9. Process of claim 8 wherein halocarbon conversion is at least 10% per pass through the carbonizing reaction.

10. Process consisting essentially of anhydrously carbonizing at least one halocarbon selected from the group consisting of perfluorocarbon and hydrofluorocarbon in the presence of excess hydrogen provided either by hydrogen fed to the carbonizing reaction or formed in situ from hydrocarbon fed to the carbonizing reaction to form carbon particles and anhydrous hydrogen fluoride as the primary reaction products, said excess of said hydrogen being with respect to the stoichiometric requirement to convert all of the fluorine of said halocarbon to said hydrogen fluoride, and recovering said carbon particles and said anhydrous hydrogen fluoride separating said carbon particles and hydrogen fluoride from each other and from other reaction products and form any unreacted hydrogen or hydrocarbon and halocarbon.

11. Process of claim 10 wherein said excess of said hydrogen is at least 1.5 times said stoichiometric requirement.

12. Process of claim 10 wherein the conversion of said halocarbon is at least 70%.

13. Process of claim 12 wherein the yield of said hydrogen fluoride is at least 90%.

14. Process of claim 10 wherein the temperature of said carbonizing is 800° C. to 1500° C.

15. Process of claim 1 wherein the temperature of said carbonizing is 800° C. to 1500° C.

* * * * *